United States Patent
Höfig

(10) Patent No.: US 11,416,363 B2
(45) Date of Patent: Aug. 16, 2022

(54) METHOD FOR RISK-BASED TESTING

(71) Applicant: Siemens Aktiengesellschaft, Munich (DE)

(72) Inventor: Kai Höfig, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/688,798

(22) Filed: Nov. 19, 2019

(65) Prior Publication Data
US 2020/0167256 A1   May 28, 2020

(30) Foreign Application Priority Data
Nov. 26, 2018   (EP) .................................... 18208363

(51) Int. Cl.
*G06F 11/263*   (2006.01)

(52) U.S. Cl.
CPC .................................. *G06F 11/263* (2013.01)

(58) Field of Classification Search
CPC .. G06F 11/079; G06F 11/263; G06F 11/3414; G06F 11/3447; G06F 11/3452; G05B 23/0283
See application file for complete search history.

(56) References Cited

U.S. PATENT DOCUMENTS

| | | | | |
|---|---|---|---|---|
| 6,909,994 | B2 * | 6/2005 | Johnson | G05B 23/0278 702/185 |
| 7,197,427 | B2 * | 3/2007 | Noonan | G06F 11/3409 702/179 |
| 7,865,333 | B2 * | 1/2011 | Becker | G05B 23/0278 702/183 |
| 9,430,311 | B2 * | 8/2016 | Lee | G06F 11/0703 |
| 9,483,342 | B2 * | 11/2016 | Hofig | G06Q 10/04 |
| 2005/0081118 | A1 * | 4/2005 | Cheston | G06F 11/0784 714/47.1 |
| 2014/0278732 | A1 | 9/2014 | Brandts et al. | |
| 2018/0060832 | A1 * | 3/2018 | Korsedal, IV | G06Q 10/20 |

OTHER PUBLICATIONS

European Search Report for Application No. 18208363.4, dated May 13, 2019.

* cited by examiner

*Primary Examiner* — Joseph R Kudirka
(74) *Attorney, Agent, or Firm* — Schmeiser, Olsen & Watts LLP

(57) ABSTRACT

Provided is a computer-implemented method, the method including storing a meta-model in a computer-readable storage medium, wherein the meta-model includes at least one risk element, at least one test element and at least one objective element, and associations between the elements, wherein each risk element is associated with one or more objective elements, and/or each risk element is associated with one or more test elements, wherein at least one element of the elements and/or at least one association has at least one associated risk-related parameter. A corresponding computer program product and system is also provided.

7 Claims, 3 Drawing Sheets

METHOD FOR RISK-BASED TESTING

CROSS-REFERENCE TO RELATED APPLICATIONS

Figure 1:
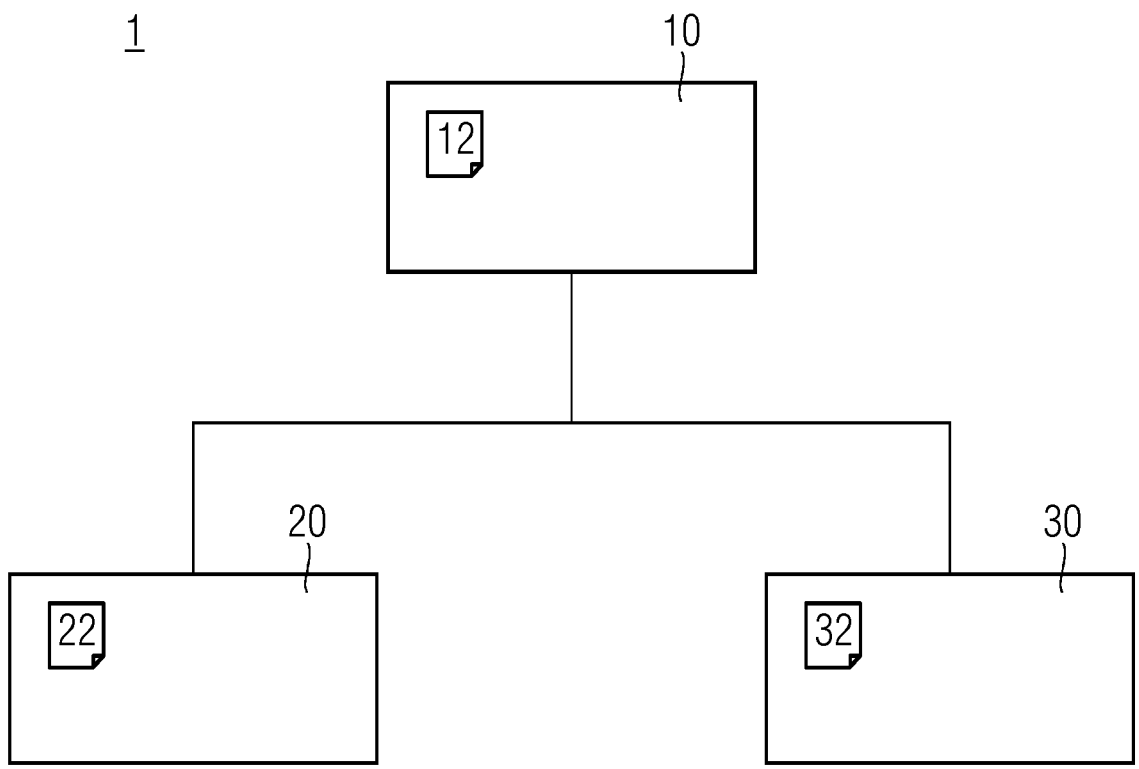

This application claims priority to EP Application No. 18208363.4, having a filing date of Nov. 26, 2018, the entire contents of which are hereby incorporated by reference.

FIELD OF TECHNOLOGY

The following relates to a computer-implemented method for risk-based testing, a corresponding computer program product and a corresponding system.

BACKGROUND

The approach risk-based testing is well known from the prior art, according to which, risk-based testing is a methodology to prioritize test cases according to their risk. The higher the risk of a failure covered by a certain set of test cases, be it in the terms of safety, reliability, availability or any other quality affecting property of a system, the higher such a set of test cases is prioritized.

Thereby, the risk-based testing aims at reducing the number of test cases to a set that is of high importance as well as reducing the test activities where not necessary.

Usually, risk-based testing includes the following aspects:
1) Risk Identification In this process, the risks are identified and categorized, a draft register of risks are prepared, risk sorting is done to identify the significant risks.

2) Risk Analysis

Risk response involves formulating the test objectives from the risks and selecting appropriate techniques to demonstrate the test activity/test technique to meet the test objectives.

3) Risk Response Planning

Document dependencies, requirements, cost, time required for testing, etc. are considered to calculate the test effectiveness score.

4) Test Scoping

Test scoping is a review activity that requires the participation of all stakeholders and technical staff. It is important to adhere to the agreed scope of risks. These risks need to be addressed by testing, and all members agree with the responsibilities assigned to them and budget allocated for these activities.

5) Test Process Definition

After the scope of testing has been finalized the test objectives, assumptions, dependencies for each test stages has to be compiled in the standard format.

Usually, a list including a risk id, a risk description, a risk probability, a risk consequence, risk exposure, effectiveness of a test and a resulting test priority number is manually maintained considering the aforementioned aspects. The manual approach, however, is a complex and time-consuming task. Further, the resulting manually maintained list, however, is error prone and does not provide a digital format to combine risk-based testing within a computer system.

SUMMARY

An aspect relates to providing a method for risk-based testing in an efficient and reliable manner.

An aspect relates to a computer-implemented method for risk-based testing, the method comprising:

a. storing a meta-model in a computer-readable storage medium, wherein b. the meta-model comprises at least one risk element, at least one test element and at least one objective element, and associations between the elements, wherein c. each risk element is associated with one or more objective elements, and/or each risk element is associated with one or more test elements, wherein d. at least one element of the elements and/or at least one association has at least one associated risk-related parameter.

Accordingly, embodiments of the invention are directed to a method for risk-based testing. A meta-model is stored in a computer-readable storage medium. The meta-model comprises elements or entities and associations or relations between the elements. The elements include at least one risk element, at least one test element and at least one objective element. Each risk element of the one or more risk elements is associated with one or more objective elements. Further, each risk element of the one or more risk elements is associated with one or more test elements. The elements itself and/or the elements can be assigned to parameters or values, which are referred to as risk-related parameters.

The risk is something that can go wrong during the execution of a system. Accordingly, for example, the risk can be directed to a functional failure or something more abstract like an erroneous system state that influences the response time to a user input.

Each risk threatens one or more objectives of the system under test. For example, if a function behaves other than expected, the objective of a correct function will be threatened. Thus, each risk element is associated with one or more objective elements.

For each risk, one or more tests or test cases can be defined that may uncover faults causing the risk during the operation of the system. Thus, each risk element is associated with one or more test elements.

The resulting meta-model provides a digital format which can be used in a technical system for risk-based testing of a system under test. The risk-based testing can be conducted in an easy, efficient and reliable manner within the technical system. A system in context of this application is any technical system, such as industrial plants and vehicles, including subsystems or components of the system.

In contrast, to the aforementioned manually maintained or generated list, any misinterpretation of textually described risks in the list which lead to inconsistencies as well as the resulting inconsistencies are prevented.

In one aspect, the one or more associated risk-related parameters of the at least one objective element and/or according association is a probability parameter and/or damage parameter. Accordingly, the objectives threatened by a risk have assigned damage parameters. Thus, different objective elements have distinct priorities and each risk can have a different impact on an objective. For example, the objective can be only slightly irritating or disturbing resulting in a low priority. Accordingly, the objectives threatened by a risk have assigned probability parameters. Thus, different objective elements have distinct probability parameters. The risk of a function to work different from being expected depends on a usage profile of that function. For example, some functions are only used rarely.

In another aspect, the one or more associated risk-related parameters of the risk element and/or according association is a test priority number and/or an exposure parameter. Accordingly, the risk elements have assigned exposure parameters. From all the objectives threatened by a risk, an exposure parameter can be calculated for that risk.

In another aspect, the exposure parameter is a product of the damage parameter and the probability parameter. Accordingly, the exposure parameter is a calculated value, in particular the product of some parameters, such as a damage parameter and a probability parameter.

In another aspect, the one or more associated risk-related parameters of the at least one test element and/or according association is a test effectiveness parameter. Accordingly, the test elements have assigned test effectiveness parameters. Each test for a risk can be of a different effectiveness to uncover certain faults. For example, a manual test execution by a human might uncover some bugs, but the effectiveness is much lower than formal mathematical proofs for a program to be correct.

In another aspect, the test priority number is a product of the probability parameter, damage parameter and the test effectiveness. The test priority number of a risk is a calculated value, in particular the product of some aforementioned parameters, such probability parameter, damage parameter and test effectiveness. This parameter provides a criteria or measure for a sufficient test. If all test priority numbers are below a certain threshold, the system will be tested sufficiently.

In another aspect, the method further comprises the steps
Instantiating the at least one risk element, the at least one test element and the at least one objective element to generate respective test instances, objective instances and objective instances specifying a technical system, by a processor, and
Storing the generated respective test instances, objective instances and objective in the computer-readable storage medium.

Accordingly, the method includes instantiating with a processor the three distinct elements, namely the risk elements, test elements and objective elements to create corresponding instances specifying (e.g. describing) a distinct (e.g. specific) part or entity of a technical system. The method also includes storing the instances, e.g. in a computer-readable medium, such as the computer-readable storage medium in which the meta-model is stored.

In a further aspect, instantiating the elements comprises:
constructing the risk instances, test instances and objective instances as objects from classes representing the at least one risk element, the at least one test element and the at least one objective element; or
generating the risk instances, test instances and objective instances as database entries from database content specifying the at least one risk element, the at least one test element and the at least one objective element.

Accordingly, object-oriented programming and/or database programming may be used.

A further aspect of embodiments of the invention is a system for performing the described method.

A further aspect of embodiments of the invention is a computer program product (non-transitory computer readable storage medium having instructions, which when executed by a processor, perform actions) directly loadable into an internal memory of a computer, comprising software code portions for performing the steps when said computer program product is running on a computer.

BRIEF DESCRIPTION

Figure 2:
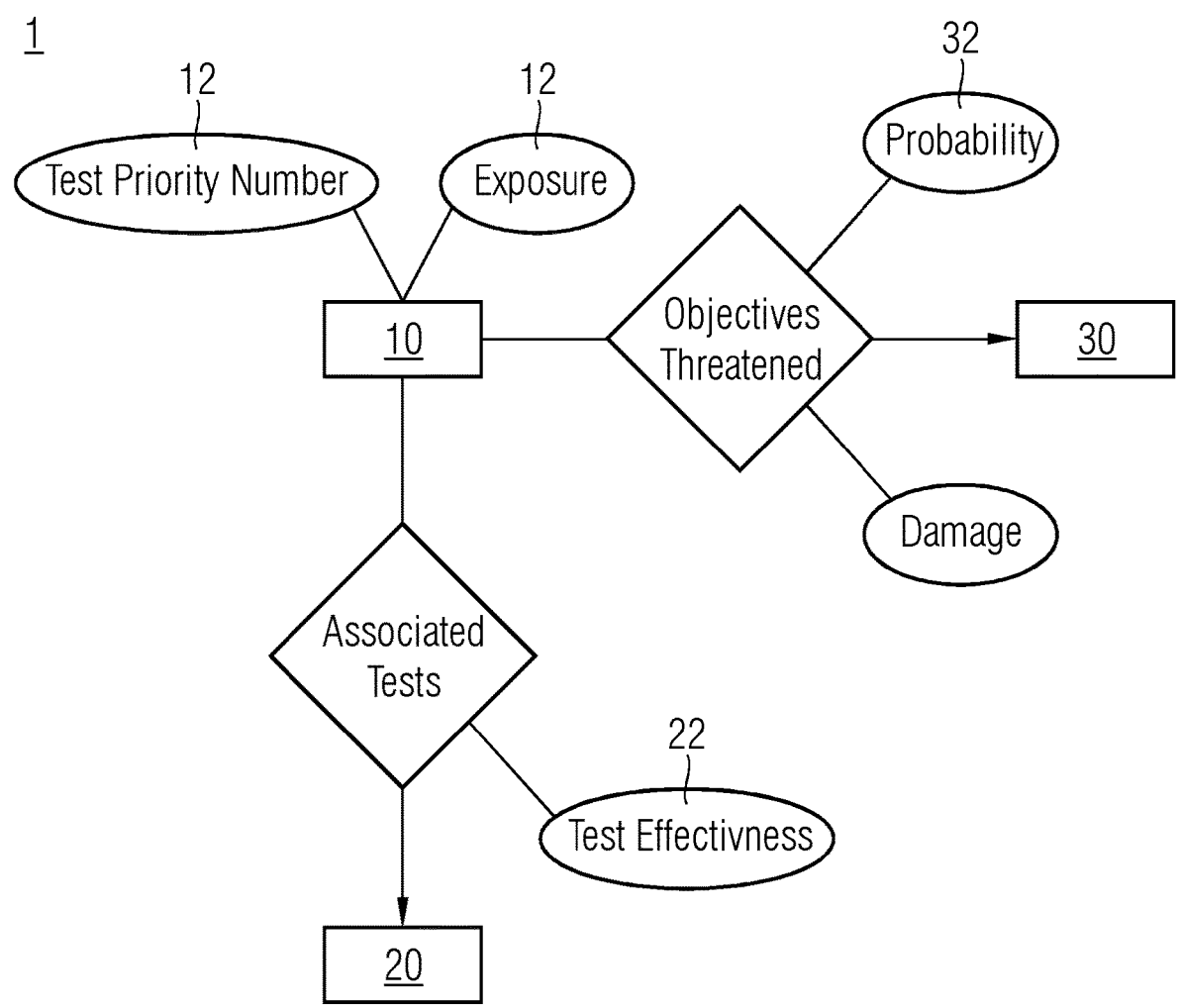
Figure 3:
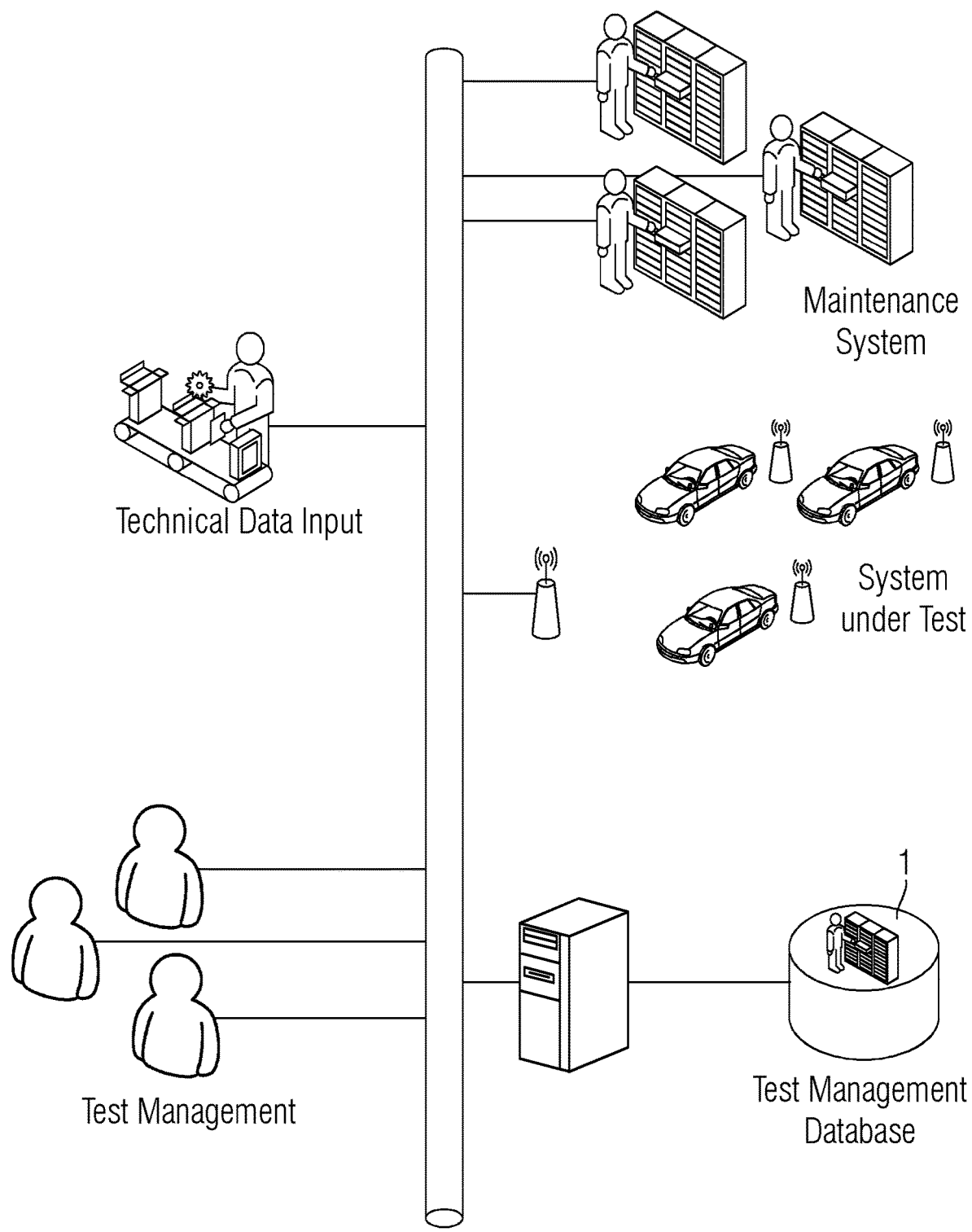

Some of the embodiments will be described in detail, with reference to the following figures, wherein like designations denote like members, wherein:

FIG. 1 illustrates a meta-model for risk-based testing according to an embodiment of the present invention;
FIG. 2 illustrates a meta-model for risk-based testing according to another embodiment of the present invention; and
FIG. 3 illustrates a technical system for risk-based testing according to an embodiment of the present invention.

DETAILED DESCRIPTION

FIG. 1 shows a schematic diagram of an exemplary meta-model 1 which can be used by the method and the technical system according to different aspects of embodiments of the present invention. The meta-model 1 comprises elements or entities, the risk element 10, the test element 20 and the objective element 30 and their associations. The elements 10, 20, 30 and/or their associations can be associated with risk-related parameters 12, 22, 32.

The meta-model 1 illustrated in FIG. 1 is stored in a computer-readable storage medium. In particular, the meta-model 1 is used for risk-based testing of an underlying system under test or system to be tested. Thereby, the technical system and/or the system under test can comprise subsystems or parts. Accordingly, the system under test or parts of it can be subject to risk-based testing.

FIG. 2 shows a different representation of the meta-model 1, wherein the risk-related parameters 12, 22, 32 are presented in more detail. Accordingly, for example, the test element 10 is assigned to the test priority number and exposure as risk-related parameters 12. As depicted, some risk-related parameters are assigned to the elements and some parameters of the parameters are assigned to the associations between the elements.

FIG. 3 shows a diagram for illustrating the technical system for supporting the risk-based testing of a system under test. The technical system comprises a database as computer-readable storage medium. The exemplary database is referred to as "Test Management Database". Alternatively, any other storage unit can be used for storing the meta-model 1. The database allows an efficient access to the meta-model.

Test managers can enter input data, in particular the test elements 20. The test managers can also relate the test elements 20 to risk elements 10 and/or objective elements 30. The input data can be entered via an interface or any other means of the technical system into the meta-model 1 by the test managers. In other words, the meta-model 1 can be extended or fed by the additional input data of the test managers or any other experts. Additionally or alternatively, the input data can be transmitted from any computing unit to the computer-readable storage medium automatically and the input data is added to the stored meta-model after reception. The computing unit can be part of the technical system or any other external component outside the technical system.

One or more tests can be automatically executed within the system under test.

Further, the technical system can comprise additional sub-systems or parts, including a maintenance system. The maintenance system can take actions or perform measures, especially with regard to the tested system and the affected sub-systems of the system under test which fail the executed tests.

Exemplary maintenance measures include:
outputting a message which comprises information about the test, other test-related data, the failure or error, the cause of the failure and/or one or more applicable error handling measures to a user of the technical system or system under test, transmitting the message to a computing unit, and/or performing one or more applicable error handling measures by the computer unit. The error handling measure can be a correction, such as adaption of the affected system or sub-system under test, switching off or disabling the affected system.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for risk-based testing, the method comprising:

storing, by a processor of a technical system, a meta-model in a computer-readable storage medium of the technical system, wherein:

the meta-model comprises at least one risk element, at least one test element and at least one objective element, and associations between the at least one risk element, the at least one test element, and the at least one objective element;

the at least one risk element is associated with one or more objective elements, and/or the at least one risk element is associated with one or more test elements; and at least one element of the at least one risk element, the at least one test element and the at least one objective element and/or at least one association has at least one associated risk-related parameter, wherein risk-related parameters include a test priority number, an exposure parameter, a damage parameter, a probability parameter, and a test effectiveness parameter, and i) the test priority number and the exposure parameter are assigned to the at least one risk element, ii) the test effectiveness parameter is assigned to an association of the at least one test element, and iii) the probability parameter and the damage parameter are assigned to an association of the at least one objective element; and performing, by the processor of the technical system, one or more error handling measures to a system under test that fails an executed test, the one or more error handling measures including at least one of: switching off the system under test and disabling the system under test;

wherein the test priority number is a product of the probability parameter, the damage parameter, and the test effectiveness parameter, and is a measure for a sufficient test such that if the test priority number is below a threshold, the system under test is sufficiently tested.

2. The method according to claim 1, wherein the exposure parameter is a product of a damage parameter and a probability parameter.

3. The method according to claim 1, further comprising:

instantiating the at least one risk element, the at least one test element and the at least one objective element to generate respective risk instances, test instances, and objective instances specifying a technical system, by a processor; and storing the generated respective test instances, the generated respective objective instances and an objective in the computer-readable storage medium.

4. The method according to claim 3, wherein instantiating the at least one risk element, the at least one test element, and the at least one objective element comprises:

constructing the risk instances, the test instances and the objective instances as objects from classes representing the at least one risk element, the at least one test element and the at least one objective element; or generating the risk instances, the test instances and the objective instances as database entries from database content specifying the at least one risk element, the at least one test element and the at least one objective element.

5. A computer program product, comprising a computer readable hardware storage device having computer readable program code stored therein, said program code executable by a processor of a computer system to implement the method according to claim 1 when said computer program product is running on a computer.

6. A system for risk-based testing, the system comprising:

a processor;

a non-transitory computer-readable storage medium, configured to store a meta-model, wherein:

the meta-model comprises at least one risk element, at least one test element and at least one objective element, and associations between the elements;

the at least one risk element is associated with one or more objective elements, and/or the at least one risk element is associated with one or more test elements;

at least one element of the at least one risk element, the at least one test element and the at least one objective element and/or at least one association has at least one associated risk-related parameter, wherein risk-related parameters include a test priority number, an exposure parameter, a damage parameter, a probability parameter, and a test effectiveness parameter, and i) the test priority number and the exposure parameter are assigned to the at least one risk element, ii) the test effectiveness parameter is assigned to an association of the at least one test element, and iii) the probability parameter and the damage parameter are assigned to an association of the at least one objective element; and a maintenance system coupled to the non-transitory computer-readable storage medium that performs one or more error handling measures to a system under test that fails an executed test, the one or more error handling measures including at least one of: switching off the system under test and disabling the system under test;

wherein the test priority number is a product of the probability parameter, the damage parameter, and the test effectiveness parameter, and is a measure for a sufficient test such that if the test priority number is below a threshold, the system under test is sufficiently tested.

7. The system according to claim 6, wherein the system further comprises a processor, configured to:

instantiate the at least one risk element, the at least one test element and the at least one objective element to generate respective risk instances, test instances and objective instances specifying a technical system; and store the generated respective risk instances, the generated test instances and an objective in the computer-readable storage medium.

\* \* \* \* \*